United States Patent
Toyama

[19]
[11] Patent Number: 6,117,048
[45] Date of Patent: Sep. 12, 2000

[54] APPARATUS AND METHOD FOR DETECTING ABRASION OF CLUTCH FOR TRANSMISSION

[75] Inventor: Makoto Toyama, Tatsunokuchi-machi, Japan

[73] Assignee: Komatsu Ltd., Tokyo, Japan

[21] Appl. No.: 09/171,075

[22] PCT Filed: Apr. 8, 1997

[86] PCT No.: PCT/JP97/01197

§ 371 Date: Oct. 9, 1998

§ 102(e) Date: Oct. 9, 1998

[87] PCT Pub. No.: WO97/38246

PCT Pub. Date: Oct. 16, 1997

[30] Foreign Application Priority Data

Apr. 10, 1996 [JP] Japan .................................. 8-113218

[51] Int. Cl.⁷ .................................................. F16H 3/083
[52] U.S. Cl. .......................... 477/180; 477/174; 477/143; 192/109 F
[58] Field of Search ..................... 477/166, 194, 477/175, 176, 180, 181, 143; 192/109 F

[56] References Cited

U.S. PATENT DOCUMENTS

| | | | |
|---|---|---|---|
| 5,035,312 | 7/1991 | Asayama et al. | 192/109 F X |
| 5,054,599 | 10/1991 | Marcott | 192/109 F X |
| 5,119,695 | 6/1992 | Milunas et al. | 477/143 |
| 5,168,973 | 12/1992 | Asayama et al. | 192/109 F X |
| 5,343,994 | 9/1994 | Kyrtos | 192/109 F X |
| 5,393,274 | 2/1995 | Smedley | 477/74 |
| 5,551,930 | 9/1996 | Creger et al. | 477/130 |
| 5,681,242 | 10/1997 | Bates | 477/180 |
| 5,853,076 | 12/1998 | McKee et al. | 192/109 F X |

FOREIGN PATENT DOCUMENTS

| | | |
|---|---|---|
| 2-61652 | 12/1990 | Japan . |
| 4-307163 | 10/1992 | Japan . |
| 5-296333 | 11/1993 | Japan . |
| 6-80054 | 11/1994 | Japan . |

*Primary Examiner*—Khoi Q. Ta
*Attorney, Agent, or Firm*—Sidley & Austin

[57] ABSTRACT

By determining the abrasion of a gear clutch during the operation of a construction machine and ascertaining the present abrasion state, it is possible to systematically predict the replacement time of a clutch disc and also to ascertain the presence of an abnormally worn clutch disc. For this purpose, in an apparatus for detecting the abrasion of a clutch of a transmission which includes plural gear clutches, hydraulic operation pistons for receiving pressurized oil from a hydraulic pump (21) to engage with these gear clutches, clutch piston chambers, and control means for selecting a gear by a depression quantity of an acceleration pedal and a signal from a vehicle speed sensor and for outputting change over instruction to a selected clutch hydraulic control valve, it is provided with a pressure sensor (29) for measuring the pressure in the clutch piston chamber, and clutch abrasion detection means (10) for storing the relation between the time T, when these clutch piston chambers are filled with pressurized oil to reach pressures of predetermined values, and the strokes L of the clutches, for storing an instruction time to the selected clutch hydraulic control valve, for finding the difference from the time when the pressure in the selected clutch piston chamber reaches a predetermined value, and for determining the abrasion of the selected gear clutch from this time difference.

11 Claims, 6 Drawing Sheets

APPARATUS AND METHOD FOR DETECTING ABRASION OF CLUTCH FOR TRANSMISSION

TECHNICAL FIELD

The present invention relates to an apparatus and a method for determining the abrasion of a clutch of a transmission, particularly to an apparatus and a method for determining the abrasion of a clutch of a transmission in which it is possible to ascertain during the operation of an engine whether or not the abrasion of a gear clutch in a construction machine exceeds a predetermined quantity.

BACKGROUND ART

Hitherto, if a shock or an unusual noise is generated upon shifting gears during traveling, it is thought that a gear clutch is abnormally worn, a transmission is taken out of a vehicle body, the abrasion of a clutch disc is measured, and, if it exceeds the regulation value, the clutch disc is considered to be worn out and it is replaced by a new one. Besides, even if such an unusual situation is not ascertained, the abrasion is measured as described above when the mileage or the working time reaches a predetermined value, and it is decided whether or not the clutch disc should be replaced by a new one. Accordingly, the abnormal wear of the clutch disc is not predicted before it occurs and is not recognized until the wear of the clutch disc actually progresses to a certain degree and an unusual situation occurs.

Hitherto, because the durations vary due to differences in working load condition even if the same type of clutch disc is used, one that may not have need of replacement may be overhauled and the clutch disc replaced as occasion demands. Furthermore, although the life of the clutch disc is designed on the supposition that it is used under the severest condition and is sufficient to endure to an overhaul, there is actually a case wherein the overhaul for inspecting the conditions of the clutch is not carried out until the clutch disc is worn in its earlier stage more than the regulation, and a slip, a vibration, or an unusual noise is generated, or it is damaged. For this reason, there is a problem in that an unexpected time is consumed, the work is late, and the working efficiency is lowered.

Besides, for example, between a case of a vehicle, such as a general motorcar or a dump truck which travels at a high speed, and a case of a bulldozer traveling at a low speed while fully driving a work machine, the transmission torques acting on the clutches vary. Therefore, the durability of the clutch disc for the vehicle such as the bulldozer, which runs at a low speed while fully driving the work machine, requires severeness more than the clutch discs of the general motorcar and the dump truck. The life of a construction machine is designed to be sufficient to endure to the time of an overhaul when it is used under a predetermined condition. Accordingly, in the construction machine in which the occasions of use at a predetermined high load are not many and which is used at a relatively light load condition, if an equal clutch disc is used, the life of the clutch disc becomes long and it is usable enough even when it is time for an overhaul. Contrarily, in the machine in which there are many cases wherein it is used at conditions higher than the predetermined high load, there is a problem in that it cannot endure to the time of an overhaul, and it is damaged.

DISCLOSURE OF THE INVENTION

The present invention is made in view of the problems of those prior arts and determines the abrasion of a gear clutch during the operation of a construction machine in order to determine the present state of the abrasion. Thereby, it aims to provide an apparatus and a method for determining the abrasion of a clutch of a transmission which is capable of systematically predicting the replacement time of the clutch disc and of detecting an abnormally worn clutch disc.

In an apparatus for determining the abrasion of a clutch of a transmission which includes plural gear clutches, hydraulic operation pistons for receiving pressurized oil from a hydraulic pump through clutch hydraulic control valves to engage with these gear clutches, clutch piston chambers for receiving the pressurized oil pressing these hydraulic operation pistons, and control means for selecting a gear by a depression quantity of an acceleration pedal and a signal from a vehicle speed sensor and for outputting a change over instruction to a selected clutch hydraulic control valve, the first aspect of the present invention comprises: pressure sensors for measuring the pressures in the above clutch piston chambers, and clutch abrasion detection means for storing the relation between the time T, when these clutch piston chambers are filled with the pressurized oil to reach the pressures of predetermined values, and the strokes L of the gear clutches, for storing an instruction time to the selected clutch hydraulic control valve, for finding the difference from the time when the pressure in the selected clutch piston chamber reaches a predetermined value, and for determining the abrasion of the gear clutches from this time difference.

Thereby, in a case of shifting up or down from the present gear (for example, the second gear) to the next gear (for example, the third gear or the first gear), the time from the start of the shifting of the gears to the completion of the filling of the clutch of the next gear is calculated. By comparing this calculated time with a base time, stored in advance, in relation to the time T, when the clutch piston chamber is filled with the pressurized oil and the pressure reaches the predetermined value, and the stroke L (the abrasion of the clutch) of the gear clutch, the abrasion of the gear clutch can be determined. Besides, it is possible to determine the abrasion of the clutch disc during the operation of the machine and to determine the present abrasion state. For this reason, the replacement time of the clutch disc can systematically be predicted and, even in a case wherein the clutch disc is abnormally worn in a short time, this can easily be determined.

The second aspect of the present invention comprises oil temperature sensors, for measuring the oil temperatures in the above clutch piston chambers, and clutch abrasion detection means, for storing the relations among the time when these clutch piston chambers are filled with the pressurized oil as to reach pressures of predetermined values, the abrasion of the clutches, and the oil temperature, for storing an instruction time to the selected clutch hydraulic control valve, for finding the difference from the time when the pressure in the selected clutch piston chamber reaches a predetermined value, and for correcting this time difference, by a signal from the oil temperature sensors, in order to determine the abrasion of the clutches.

Thereby, even if the temperature is not within a predetermined range, the abrasion of the gear clutches can be accurately determined.

The third aspect of the present invention comprises revolution sensors for an output shaft of an engine for measuring the flow rates of the pressurized oil to the above clutch piston chambers, and clutch abrasion detection means for storing the relations among the time when these clutch piston chambers are filled with the pressurized oil to reach pressures of predetermined values, the abrasion of the clutches, and the oil temperature, for storing an instruction time to the selected clutch hydraulic control valve, for finding the difference from the time when the pressure in the selected clutch piston chamber reaches a predetermined value, and for correcting this time difference by a signal from the above revolution sensor for an output shaft in order to determine the abrasion of the clutches.

Thereby, even if the rate of rotation of the engine is not within a predetermined range, the abrasion of the gear clutches can be accurately determined.

The fourth aspect of the present invention is that the above clutch hydraulic control valves are further provided with flow rate detection valves for detecting the flows of the pressurized oil from the above hydraulic pump to the above clutch piston chambers, and for outputting a signal when the flows of the pressurized oil are stopped.

Thereby, even if no pressure sensor is provided, the abrasion of the gear clutches can accurately be determined.

In a method for determining the abrasion of a clutch of a transmission which includes plural gear clutches, hydraulic operation pistons for receiving pressurized oil from a hydraulic pump through clutch hydraulic control valves to engage with these gear clutches, clutch piston chambers for receiving the pressurized oil pressing these hydraulic operation pistons, and control means for selecting a gear by a depression quantity of an acceleration pedal and a signal from a vehicle speed sensor, and for outputting a change over instruction to a selected clutch hydraulic control valve, in a traveling state, in a case of shifting up or down from the present gear to the next gear to which an instruction for shifting gears is outputted, the fifth aspect of the present invention measures the time from the start of this shifting of the gears to the completion of the filling of the pressurized oil in the next clutch piston chamber, and determines the abrasion of the gear clutches by the relation between the time T, from the start of the shifting of the gears to the completion of the filling of the pressurized oil in the above clutch piston chambers, found in advance, and the stroke L of the clutches.

Thereby, an operation and effect, similar to those of the apparatus for determining the abrasion of the clutch of the transmission described in the first aspect of the present invention, can be obtained.

BEST MODE FOR CARRYING OUT THE INVENTION

The first embodiment of an apparatus for determining the abrasion of a clutch of a transmission according to the present invention will be described in detail with reference to FIGS. 1–3.

Figure 1:
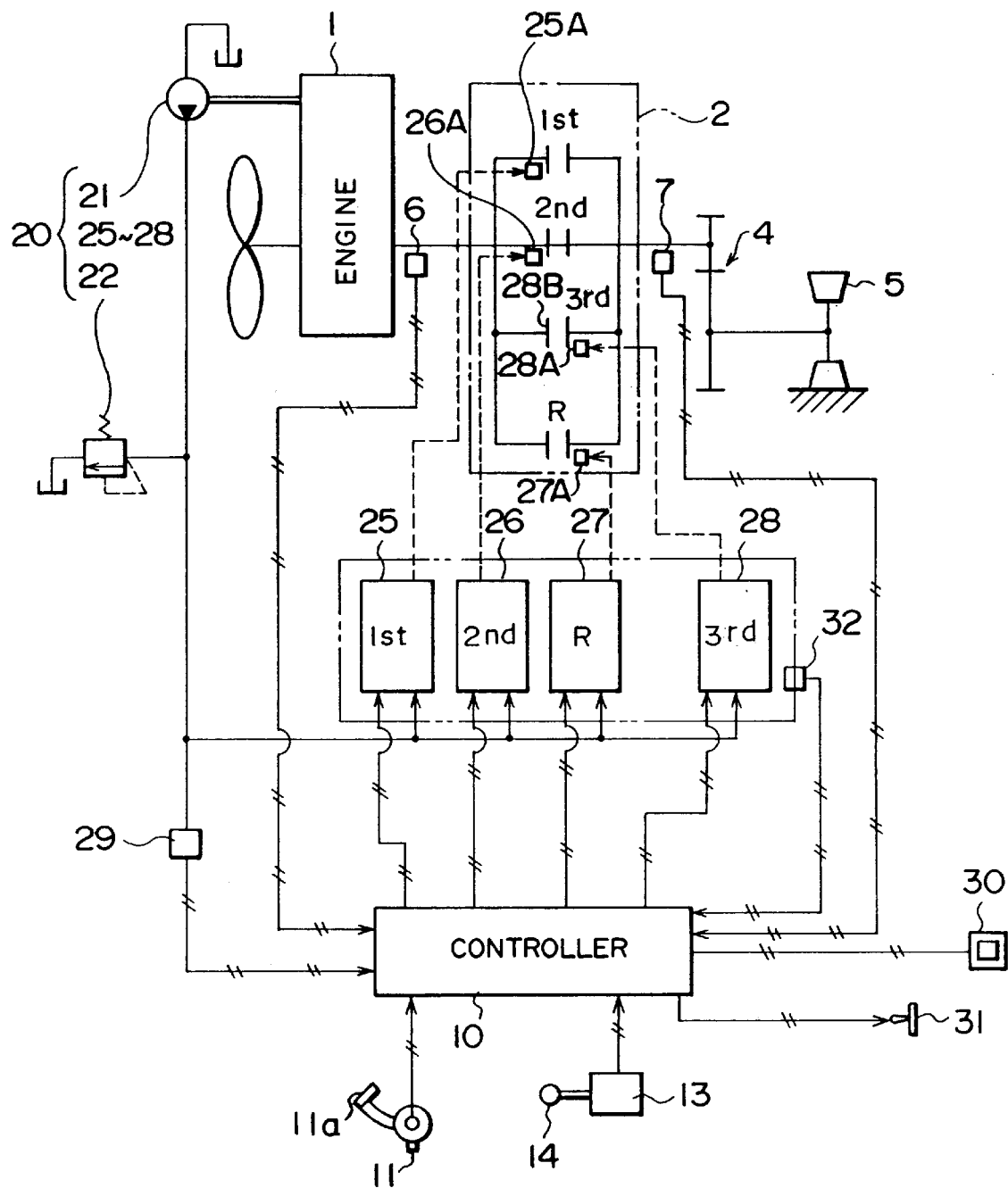
FIG. 1 is a block diagram of the first embodiment of an apparatus for determining the abrasion of a clutch of a transmission according to the present invention.

In FIG. 1, the output of an engine 1 is transmitted to a transmission 2, and the output of the transmission 2 is transmitted to a driving wheel 5 via a differential gear (not shown) and a final reduction gear 4. The transmission 2 is provided with a revolution sensor 6 for a transmission input shaft (i.e., for an engine output shaft) and a revolution sensor 7 for a transmission output shaft located on the input axis and the output axis, respectively, of the transmission 2. The signals from the revolution sensor 6 for the input shaft and the revolution sensor 7 for the output shaft are inputted to a controller 10.

A sensor 11 for the depression quantity of the accelerator pedal is attached to the accelerator pedal 11a. The sensor 11, for the depression quantity of the accelerator pedal, detects a depression quantity of the accelerator pedal 11a; and a signal S, representing the depression quantity, is inputted to the controller 10. A shift selector 13 inputs to the controller 10 signals $I_1$, $I_2$, $I_3$ and $I_4$, representing shift positions (1, 2, D and R), respectively, selected via a shift lever 14. The controller 10 determines a gear region, in which automatic shifting of the gears is performed. Responsive to each of the input shift position signals $I_1$, $I_2$, $I_3$ and $I_4$. The controller 10 controls the clutch pressure of the gear clutch according to the selected gear of the transmission 2 so as o obtain the optimum gear in the above gear region on the basis of a signal N1, for the rate of rotation of the transmission output shaft, inputted from the revolution sensor 7 for the output shaft, and the accelerator signal S, inputted from the sensor 11 for the depression quantity of the accelerator pedal. Here, the clutch pressure is supplied to any of the clutches for the 1st, 2nd, R, and 3rd gears of the transmission 2, via a clutch oil pressure supply device 20, to shift the gears up or down one by one.

For example, in the case of selecting the shift position D with the shift lever 14, the automatic shifting of the gears in the gear region from the first gear to the third gear is made possible by the controller 10, and the shifting of the gears up or down in this gear region is performed in a known pattern in accordance with the signal N1, for the rate of rotation of the output shaft, and the accelerator signal S.

The clutch oil pressure supply device 20, for supplying pressurized oil to each of the 1st, 2nd, R, and 3rd clutches, comprises a hydraulic pump 21, a relief valve 22, and clutch hydraulic control valves 25, 26, 27 and 28, which are connected in parallel with the hydraulic pump 21 and the relief valve 22. A pressure sensor 29 is disposed between the hydraulic pump 21 and the clutch hydraulic control valves 25, 26, 27 and 28, with plurality of pressure sensors 29, one could be disposed between a respective one of the 1st, 2nd, R, and 3rd clutches and a respective one of the clutch hydraulic control valves 25, 26, 27 and 28. A pressure signal from the pressure sensor 29 is inputted to the controller 10. Each of the clutch hydraulic control valves 25, 26, 27, and 28 comprises a two-position electromagnetic hydraulic control valve and is connected to each of clutch piston chambers 25A, 26A, 27A, and 28A of the transmission 2. Each of the clutch hydraulic control valves 25, 26, 27, and 28 is designed to be changed over from the interruption position into the communication position in response to an instruction from the controller 10 in order to supply pressurized oil from the hydraulic pump 21 to the respective one of the clutch piston chambers 25A, 26A, 27A, and 28A. For example, when the clutch hydraulic control valve 26 receives the instruction, it supplies pressurized oil to the clutch piston chamber 26A, and the 2nd clutch is connected so as to transmit power.

A display 30, displaying the abrasion of the clutch, and an alarm 31, giving an alarm when the abrasion of the clutch gets near the limit value, are connected to the controller 10. A temperature sensor 32, detecting a temperature of the clutch oil, is connected to the controller 10.

Next, the operation of this embodiment will be described with reference to FIGS. 2A, 2B, and 3.

Figure 2A:
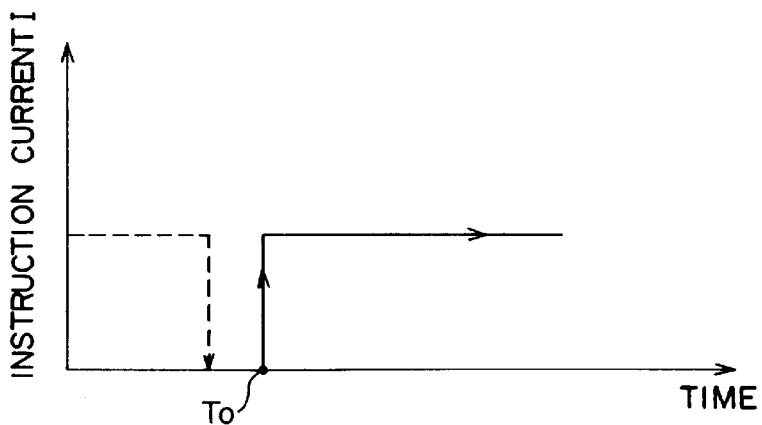
FIGS. 2A and 2B are time charts of the first embodiment, FIG. 2A showing an instruction current I from a controller to a clutch hydraulic pressure control valve and FIG. 2B showing a change in the clutch oil pressure P in a clutch piston chamber.
Figure 2B:
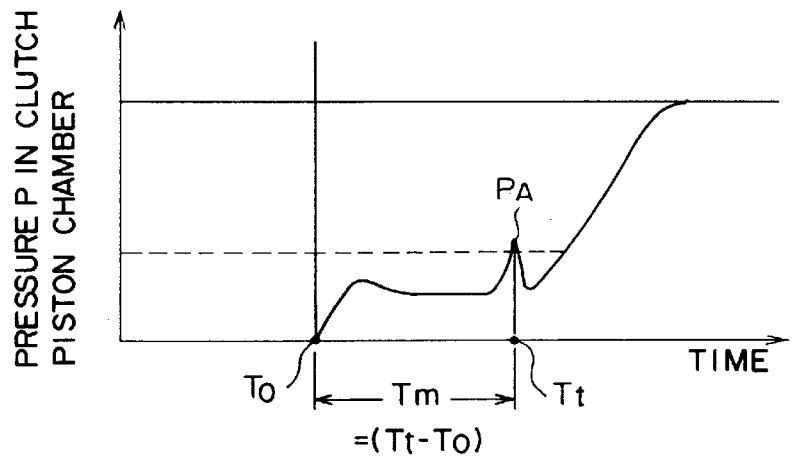
Figure 3:
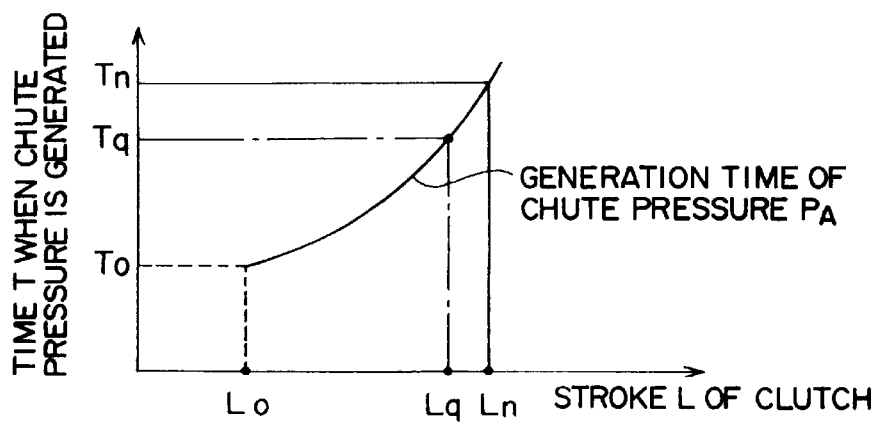
FIG. 3 is a view of the relation between the stroke L of a clutch and the time when a chute pressure $P_A$ is generated.

FIG. 2A shows a change in an instruction current I from the controller 10 to the respective ones of the clutch hydraulic control valves 25, 26, 27, and 28; and FIG. 2B is a view showing a change in the clutch oil pressure P in the selected clutch piston chamber 25A, 26A, 27A or 28A. FIG. 3 is a view showing the relation between the stroke L of the clutch stored, in the controller 10 in advance, and the time T when a chute pressure $P_A$ is generated. In FIG. 3, $L_0$ shows a stroke value at the beginning when the clutch is assembled, $L_n$ shows a stroke value after n hours of operation when the clutch is worn and the stroke has increased, and $L_q$ is a stroke value showing the abrasion limit of the clutch. For example, suppose that, in traveling, the shift position D is selected with the shift lever 14, in traveling, the controller 10 receives the signal N1, for the rate of rotation of the output shaft, from the revolution sensor 7 for the output shaft, and the accelerator signal S, from the sensor 11 for the depression quantity of the accelerator pedal, to shift the speed range from the 2nd gear to the 3rd gear. At this time, the controller 10 stops the instruction output to the clutch hydraulic control valve 26 for the 2nd gear as shown by the dash line in FIG. 2A, outputs a change over instruction to the clutch hydraulic control valve 28 for the 3rd gear as shown by the solid line in FIG. 2A, and stores the time to when this change over instruction over is outputted. Thereby, the position of the clutch hydraulic control valve 28 for the 3rd gear is changed so that pressurized oil from the hydraulic pump 21 is supplied to the clutch piston chamber 28A for the 3rd gear. Receiving this pressurized oil, the pressure in the clutch piston chamber 28A for the 3rd gear gradually increases to move the clutch. When the clutch moves by a predetermined quantity and comes into contact with a plate 28B on the fixation side, a chute pressure $P_A$ that the pressure P rises suddenly in a moment as shown in FIG. 2B, is generated. The chute pressure $P_A$ is measured by the pressure sensor 29 and is sent to the controller 10.

The controller 10 stores the time Tt, when the chute pressure $P_A$ at this time is generated, and calculates the time difference Tm (Tm=Tt−To) from the time To, when the change over the instruction to the clutch hydraulic control valve 28 for the 3rd gear is outputted. The controller 10 determines the stroke Lm of the clutch for the 3rd gear at this time difference Tm from the relation between the time T, when the chute pressure $P_A$ shown in FIG. 3 is generated, and the stroke L of the clutch, and judges whether or not the clutch has reached the abrasion limit $L_q$. The stroke Lm of this clutch is displayed on the display 30. Besides, when the clutch reaches the abrasion limit $L_q$, the alarm 31 outputs an alarm.

Although changing over during traveling is measured in this described embodiment, it can be measured upon starting from a stop, and it can also be measured with braking upon stopping. Besides, when measuring, it can be continuous, or at predetermined periods.

Figure 4:
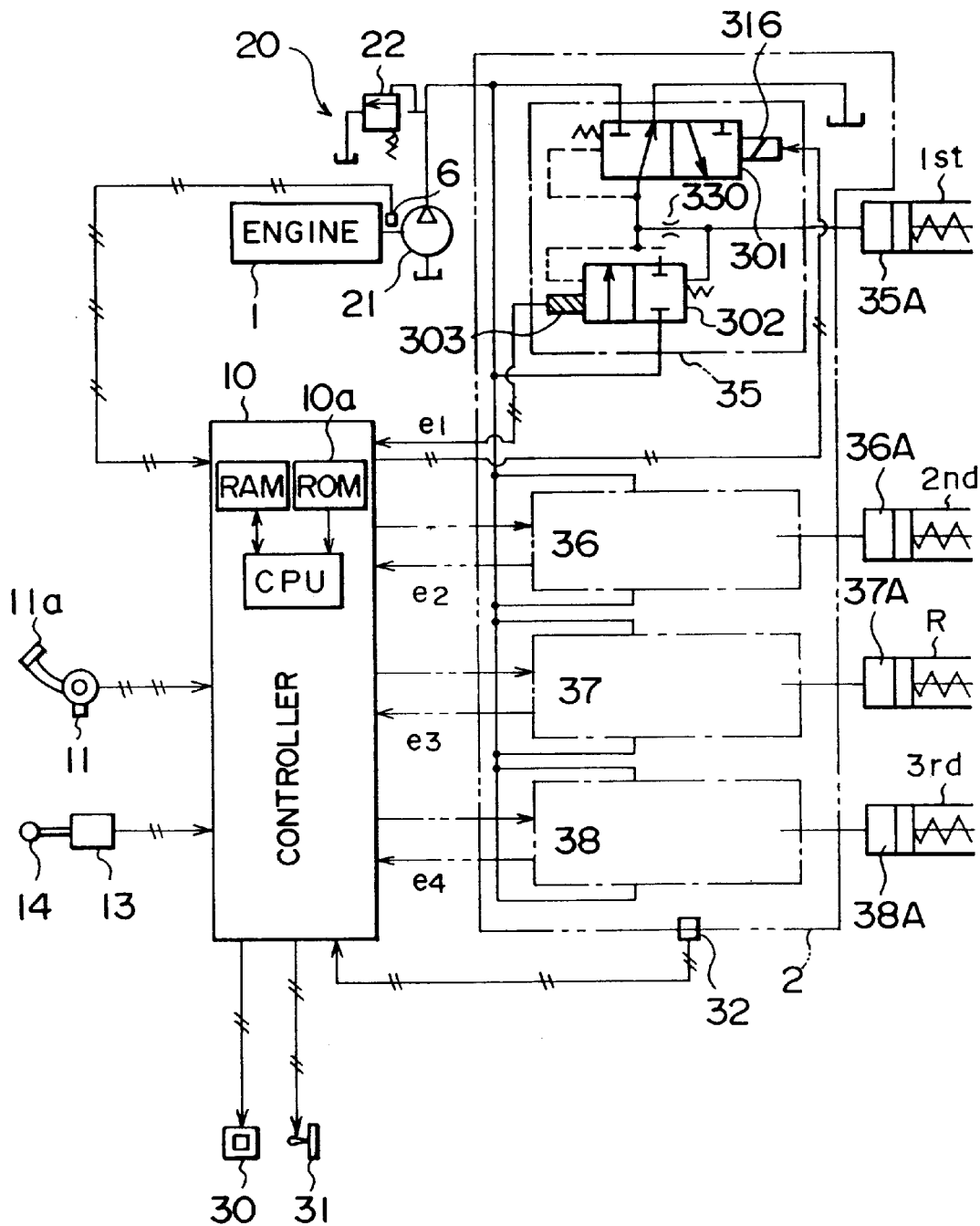
FIG. 4 is a block diagram of the second embodiment of an apparatus for determining the abrasion of a clutch of a transmission according to the present invention.
Figure 5:
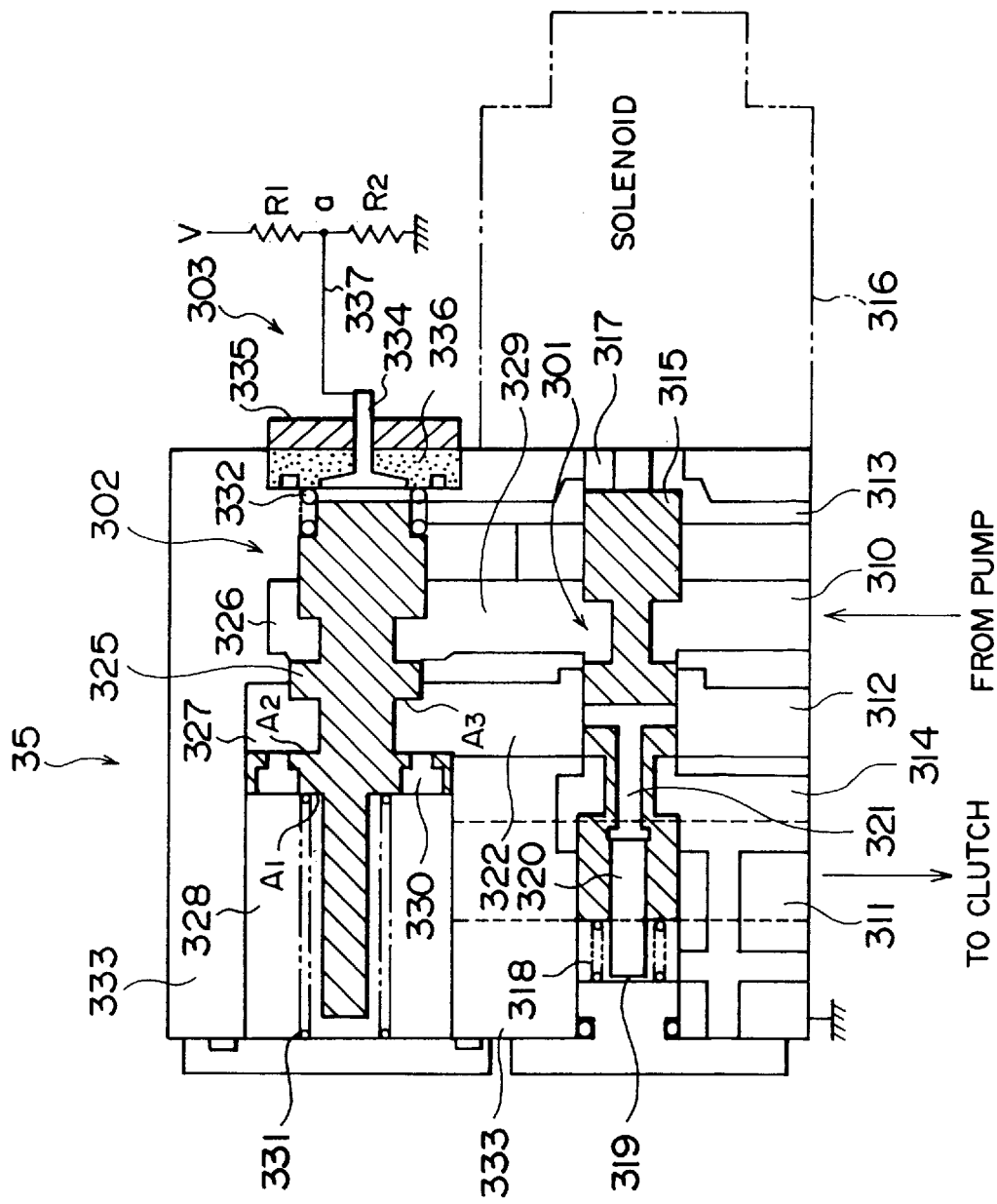
FIG. 5 is a cross-sectional view of a clutch hydraulic pressure control valve used in the second embodiment.

FIG. 4 is a block diagram of the second embodiment of an apparatus for detecting the abrasion of a clutch of a transmission according to the present invention. Although a respective two-position electromagnetic hydraulic control valve is used as each of the clutch hydraulic control valves 25, 26, 27, and 28 in the first embodiment, each of the clutch hydraulic 35, 36, 37, and 38 comprises a pressure control valve 301 for controlling the clutch oil pressure, a flowrate detection valve 302, and a sensor 303 for detecting the completion of filling. FIG. 5 shows an example of a cross-sectional view of the clutch hydraulic control valve 35 that is one of the clutch hydraulic control valves 35, 36, 37, and 38.

Here, the pressure proportional control valve 301 is controlled by the controller 10 as shown in FIG. 4, and a detection signal from the sensor 303 at the flowrate detection valve 302 is inputted to the controller 10. The clutch hydraulic control valve 35 flows pressurized oil from the pump 21 through an input port 310 as shown in FIG. 5, and supplies the pressurized oil to a clutch piston chamber 35A of the clutch through an output port 311 (shown by a dotted line). A port 312 is closed, and ports 313 and 314 are drain ports.

The pressure proportional control valve 301 has a spool 315; the right end of this spool 315 is brought into contact with a plunger 317 of a proportional solenoid, and a spring 318 is provided on the left end. In an oil chamber 320, defined by the spool 315 and a piston 319, the pressurized oil in an oil passage 322 is fed back through an oil passage 321, formed in the spool 315.

The flowrate detection valve 302 has a spool 325; and oil chambers 326, 327, and 328 are defined by this spool 325. An orifice 330 is formed between the oil chambers 327 and 328 of this spool 325. The spool 325 is constructed to have three different areas A1, A2, and A3 for receiving pressure, among which the relations of A1+A3>A2, and

A2>A3 are present. A spring 331 is provided on the left end of the spool 325, and a spring 332 is provided on the right end. When no pressure exists in either of the oil chambers 327 and 328, the spool 325 is kept at the neutral position shown in FIG. 5, i.e., at the position of the free length of each of the springs 331 and 332. That is, in this case, the spring 331 operates as a return spring for the spool 325 and the spring 332 operates as a spring for establishing pressure for detecting a clutch oil pressure.

The clutch oil spring is detected by a detection pin 334. That is, it is detected by the further movement of the spool 325 in the direction from the neutral position, shown in FIG. 5, to the right against the spring force of the spring 332. The detection pin 334 is fitted to a body 333 via an insulating sheet 336 and a cover 335, and a lead 337 extends outwardly from the detection pin 334. The lead 337 is connected to a fixed point a between resistances R1 and R2 which are connected in series. A predetermined direct voltage V is applied across the resistances R1 and R2, and the valve body 333 is grounded.

Figure 6A:
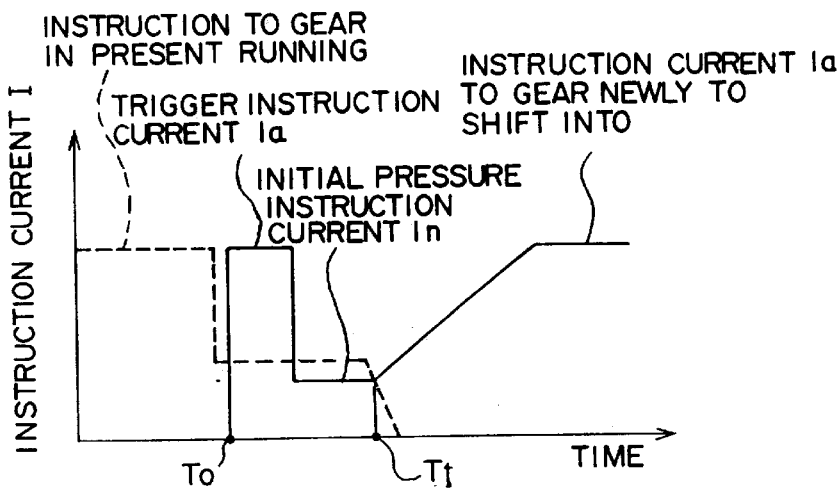
FIGS. 6A, 6B, and 6C are time charts of the second embodiment, FIG. 6A showing an instruction current I from a controller to a clutch hydraulic pressure control valve, FIG. 6B showing a change in the clutch oil pressure P in a clutch piston chamber, and FIG. 6C showing a current output e of a sensor.
Figure 6B:
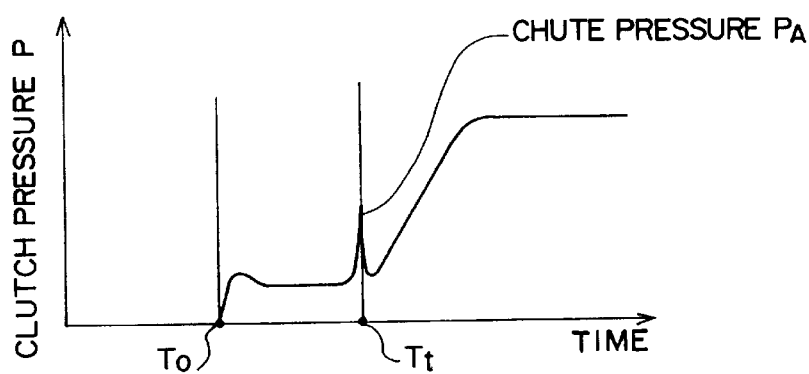
Figure 6C:
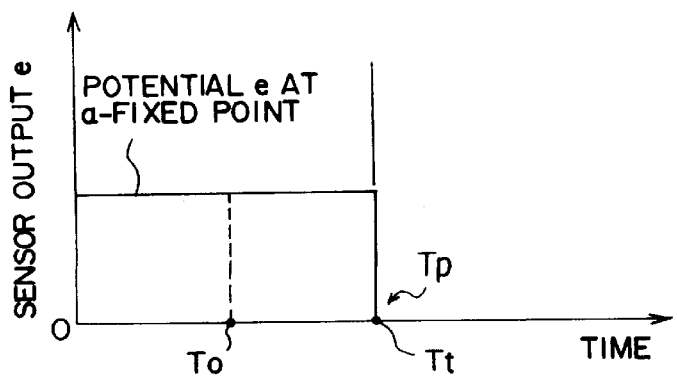

Next, the operation of this embodiment will be described with reference to the time charts of FIGS. 6A–6C. FIG. 6A shows an instruction current I from the controller 10 to the respective ones of the clutch hydraulic control valves 35, 36, 37, and 38, FIG. 6B shows the clutch pressure P in the respective one of the clutch piston chambers 35A, 36A, 37A, and 38A; and FIG. 6C shows a sensor output e from the sensor 303.

In a case of the shifting of the gears, the controller 10 decides a gear region in which the automatic shifting of the gears is performed, by a selected shift position signal from the shift selector 13. It selects the optimum gear in this gear region on the basis of the signal N1, for the rate of rotation of the output shaft, outputted by the revolution sensor 7 for output shaft, and the accelerator signal S, from the sensor 11 for the depression quantity of the accelerator pedal. Besides, for supplying the pressurized oil from the clutch oil pressure supply device 20 to the clutch according to the selected optimum gear, the controller 10 outputs an instruction current Ia to the corresponding clutch hydraulic control valve. That is, this instruction current Ia inputs a trigger instruction current Ia to the solenoid 316 of the corresponding clutch hydraulic control valve at a time To as shown in FIG. 6A, and then lowers the instruction current Ia to a predetermined initial pressure instruction current In, corresponding to the initial pressure of this clutch, and waits in this state until the time of the completion of filling. At this time, the controller 10 inputs the time To when the trigger instruction current Ia is inputted, to a memory 10a.

By inputting the above trigger instruction current Ia, the spool 325 of the pressure control valve 301 is moved in the left direction in FIG. 5 and pressurized oil from the pump 21 flows into the oil chamber 327 of the flowrate detection valve 302 through the input port 310 and the oil passage 322. The oil, having entered the oil chamber 327, flows into the oil chamber 328 through the orifice 330 and flows into the clutch through the output port 311. In this time, because a differential pressure is generated between the above oil chambers 327 and 328 by the orifice 330, the spool moved further to the left.

As a result, the flowrate detection valve 302 becomes open, and the pressurized oil, having flowed in from the pump 21 to the oil passage 329, flows into the oil chamber 327 through the oil chamber 326, and then flows into the clutch through the orifice 330, the oil chamber 328, and the output port 311. The flow of this pressurized oil continues until the clutch piston chamber 35A is filled with the pressurized oil. Here, when the spool 325 is at the neutral position shown in FIG. 5, and during the actual filling time Tt when the spool 325 is moved to the left of this neutral position, the spool 325 is apart from the detection pin 334. For this reason, in this state, the potential e at the fixed point a becomes a voltage value where the voltage v is divided between the resistances R1 and R2. When the clutch piston chamber 35A is filled with the pressurized oil, the filling is completed, and because the pressurized oil does not flow any more, there is no differential pressure across the orifice 330.

Accordingly, the spool 325 moves to the right by a force wherein a force due to the difference (A1+A3−A2) in the area for receiving pressure is added to the restoring force of the spring 331. Upon this return operation, because the spool 325 is connected with the grounded body 333, the potential at the fixed point a drops to zero as shown in FIG. 6C and no voltage appears at the fixed point a. The potential at this fixed point is inputted to the controller 10 as the voltage e. Accordingly, the controller 10 judges the completion of filling with the drop time Tp of the potential at this fixed point a. The voltage e is outputted from each of the clutch hydraulic control valves 35, 36, 37, and 38 as a voltage $e_1$, $e_2$, $e_3$, or $e_4$. After this completion of filling is judged, the controller 10 immediately increases the current I to the corresponding clutch from the initial pressure instruction current In toward the instruction current Ia gradually as shown in FIG. 6A. The time Tp, when this completion of filling is judged, is inputted to the memory 10a of the controller 10. By monitoring the potential at this fixed point a, the controller 10 can detect the completion of filling and can also know the presence of the clutch pressure, that is, the engaging state of the clutch.

Here, the actual filling time Tt is the time until the rate of relative rotation of the clutch becomes zero after the shifting of the gears; and the time Tp, when the completion of filling is judged, is the time after the clutch for the shifting of the gears is filled with the oil and the clutch disc starts moving until it comes into contact with the clutch plate, but a value approximating the actual filling time Tt is employed. When the above clutch disc is worn, the time after the filling with the oil and the clutch disc starts moving until it comes into contact with the clutch plate becomes long. That is, by measuring the actual filling time Tt, it can be known to what extent the clutch disc is actually worn.

In the present invention, when the abrasion of the clutch disc is determined, the following methods can be employed. As the first method, the temperature of the clutch operation oil is measured and the abrasion of the clutch plate is corrected responsive to the relation of the viscosity of the clutch operation oil to the measured temperature. As the second method, the rate of rotation of the engine 1 is measured to correct the abrasion of the clutch disc.

Figure 7:
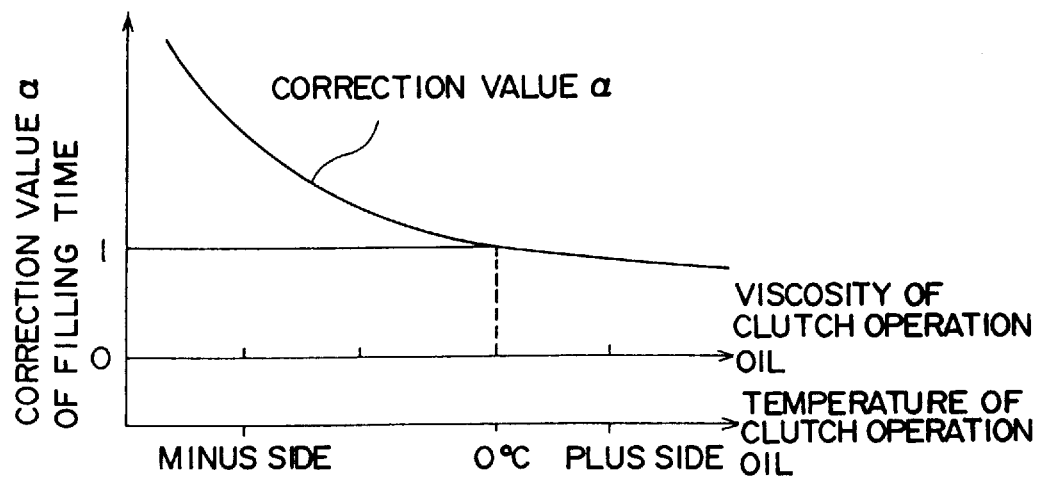
FIG. 7 is a view showing the relation between the viscosity or the temperature of a clutch operation oil and a correction value for a filling time Tt.

As the first method, the relation between the viscosity of the clutch operation oil and a correction value α of the filling time Ttn is found in the beginning as shown in FIG. 7, and this relation is inputted to the memory 10a of the controller 10. In FIG. 7, the viscosity of the clutch operation oil or the temperature of the clutch operation oil is taken on the horizontal axis, the correction value α of the filling time Ttn is taken on the vertical axis, and the relation between both is shown by a correction value α curve.

When the filling time Ttn is measured, the temperature of the clutch operation oil is measured with the temperature sensor 32. Next, the measured filling time Ttn is corrected by the correction value α (Tt=Ttn/α). The stroke L of the clutch is found from this corrected filling time Tt by FIG. 3 to obtain the actual abrasion. Thereby, the abrasion of the clutch can be determined more accurately.

Figure 8:
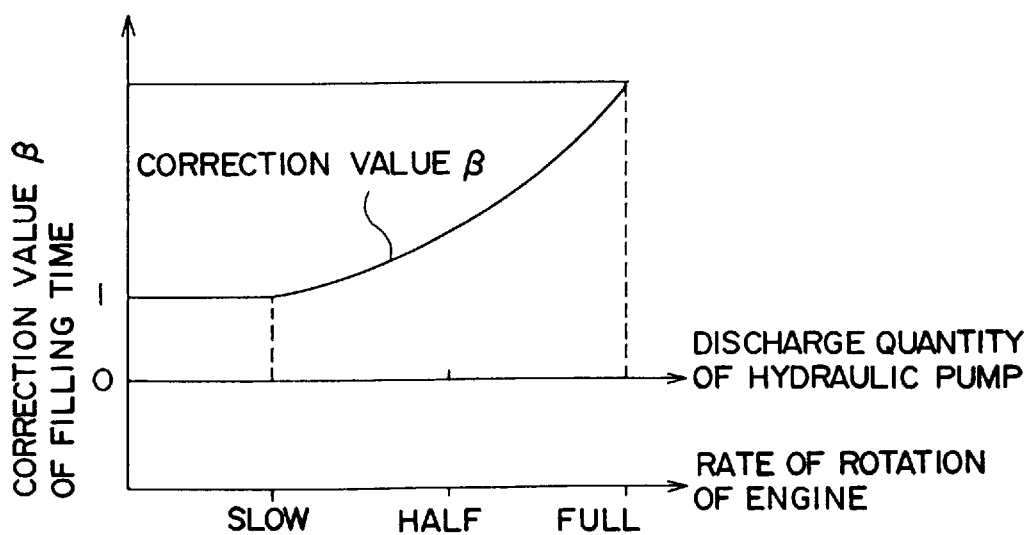
FIG. 8 is a view showing the relation between the rate of rotation of an engine or the discharge quantity of a hydraulic pump and a correction value for a filling time Tt.

As the second method, the relation between the discharge quantity (the rate N of the rotation of the engine 1×the discharge volume cc/rev of the hydraulic pump 21) of the hydraulic pump 21 and a correction value β of the filling time Ttr is found in the beginning as shown in FIG. 8, and this relation is inputted to the memory 10a of the controller 10. In FIG. 8, the discharge quantity of the hydraulic pump 21 or the rate of rotation of the engine 1 is taken on the horizontal axis, the correction value β of the filling time Ttr is taken on the vertical axis, and the relation between both is shown by a correction value β curve.

When the filling time Ttr is determined, the rate N of rotation of the engine 1 is measured with the revolution sensor 6 for the transmission input shaft. Next, the flow rate flowing in the clutch piston chamber is found from the rate N of the rotation of the engine 1 and the discharge volume cc/rev of the hydraulic-pump 21. The above determined filling time Ttr is corrected by the correction value β (Tt=Ttr/β). The stroke L of the clutch is found from this corrected filling time Tt by FIG. 3 to obtain the actual abrasion. Thereby, the abrasion of the clutch can be determined more accurately.

According to the present invention, upon shifting up/shifting down from the present gear to another gear in a traveling state of a construction machine, when the time from the start of the operation of the shifting of the gears to the completion of filling with the clutch pressurized oil exceeds a predetermined value, it can be judged that the clutch disc has reached the limit abrasion and should be replaced. Accordingly, it can be prevented that the clutch disc is worn more than the limit abrasion in traveling to generate a slip phenomenon; the loss of the power transmission is restrained to the minimum; and damages of gears and other construction parts can be avoided beforehand. Besides, because it is constructed to let the operator know by a buzzer or the like when it becomes an abnormal abrasion state, it becomes possible to perform in advance the arrangement of the equipment, a worker, for a hasty replacement of the clutch disc, and the time of overhaul can systematically be determined. Furthermore, when the work under a relatively low load is long in the working period and a veteran operator operates, there is a case wherein the clutch disc is not so worn as to need to be replaced though it is the time for overhaul. In this case, because it is needless to stop the machine to overhaul, the work can be continuously progressed so the working efficiency is Improved.

INDUSTRIAL APPLICABILITY

The present invention determines the abrasion of a gear clutch during the operation of a construction machine, such as a bulldozer, and ascertains the present abrasion state. Thereby, it is useful as an apparatus and a method for determining the abrasion of a clutch of a transmission in which the replacement time of the clutch disc can systematically be predicted and the presence of an abnormally worn clutch disc can also be ascertained.

What is claimed is:

1. An apparatus for determining abrasion of a clutch of a transmission which includes plural gear clutches, hydraulic operation pistons for receiving pressurized oil from a hydraulic pump through clutch hydraulic control valves to engage with these gear clutches, clutch piston chambers for receiving pressurized oil pressing these hydraulic operation pistons, and control means for selecting a gear by a depression quantity of an acceleration pedal and a signal from a vehicle speed sensor and for outputting a change over instruction to a selected clutch hydraulic control valve, said apparatus comprising:

a pressure sensor for measuring a pressure in a clutch piston chamber; and clutch abrasion detection means for storing a relation between a time T, when a respective clutch piston chamber is filled with pressurized oil so as to reach a predetermined pressure value, and a stroke L of the clutch corresponding to said respective clutch piston chamber; for storing a time when a change over instruction is outputted to a selected clutch hydraulic control valve; for finding a time difference between (a) a time when said change over instruction is outputted to said selected clutch hydraulic control valve and (b) a time when a pressure in the clutch piston chamber corresponding to the selected clutch hydraulic control valve reaches a predetermined value; and for determining the abrasion of the gear clutch corresponding to the selected clutch hydraulic control valve from this time difference.

2. An apparatus in accordance with claim 1, further comprising:

an oil temperature sensor for measuring temperature of oil in said clutch piston chambers; and wherein said clutch abrasion detection means stores the relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said oil temperature sensor; and determines the abrasion of the gear clutch corresponding to the selected clutch hydraulic control valve from this corrected time difference.

3. An apparatus in accordance with claim 2, further comprising:

an engine having an output shaft;

a revolution sensor for said output shaft for determining flow rate of pressurized oil to a respective clutch piston chamber; and wherein said clutch abrasion detection means stores relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said oil temperature sensor and a signal from said revolution sensor; and determines the abrasion of the gear clutch corresponding to the selected clutch hydraulic control valve from this corrected time difference.

4. An apparatus in accordance with claim 1, further comprising:

an engine having an output shaft;

a revolution sensor for said output shaft for determining flow rate of pressurized oil to a respective clutch piston chamber; and wherein said clutch abrasion detection means stores relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said revolution sensor; and determines the abrasion of the gear clutch corresponding to the selected clutch hydraulic control valve from this corrected time difference.

5. An apparatus for determining abrasion of a clutch of a transmission which includes plural gear clutches, hydraulic operation pistons for receiving pressurized oil from a hydraulic pump through clutch hydraulic control valves to engage with these gear clutches, clutch piston chambers for receiving pressurized oil pressing these hydraulic operation pistons, and control means for selecting a gear by a depression quantity of an acceleration pedal and a signal from a vehicle speed sensor and for outputting a change over instruction to a selected clutch hydraulic control valve, said apparatus comprising:

flow rate detection valves for detecting flows of pressurized oil from said hydraulic pump to said clutch piston chambers and for outputting a signal when the flows of pressurized oil are stopped;

clutch abrasion detection means for storing a relation between a time T, when a respective clutch piston chamber is filled with pressurized oil so as to reach a predetermined pressure value, and a stroke L of the clutch corresponding to said respective clutch piston chamber; for storing a time when a change over instruction is outputted to a selected clutch hydraulic control valve; for finding a time difference between (a) a time when said change over instruction is outputted to said selected clutch hydraulic control valve and (b) a time when said signal from said flow rate detection valves indicates that the flows of pressurized oil are stopped; and for determining the abrasion of the gear clutch corresponding to the selected clutch hydraulic control valve from this time difference.

6. Apparatus comprising:

a hydraulic pump;

an acceleration pedal;

a speed sensor;

a plurality of clutch hydraulic control valves;

a transmission which includes a plurality of gear clutches, hydraulic operation pistons for receiving pressurized oil from said hydraulic pump through respective ones of said clutch hydraulic control valves to engage with corresponding ones of said plurality of gear clutches, and clutch piston chambers for receiving pressurized oil pressing these hydraulic operation pistons;

a pressure sensor for measuring a pressure in a clutch piston chamber; and control means for selecting a gear by a depression quantity of said acceleration pedal and a signal from said speed sensor and for outputting a change over instruction to a selected clutch hydraulic control valve; for storing a relation between a time T, when a respective clutch piston chamber is filled with pressurized oil so as to reach a predetermined pressure value, and a stroke L of the clutch corresponding to said respective clutch piston chamber; for storing a time when a change over instruction is outputted to a selected clutch hydraulic control valve; for finding a time difference between (a) a time when said change over instruction is outputted to said selected clutch hydraulic control valve and (b) a time when a pressure in the clutch piston chamber corresponding to the selected clutch hydraulic control valve reaches a predetermined value; and for determining an abrasion of the gear clutch corresponding to the selected clutch hydraulic control valve from this time difference.

7. An apparatus in accordance with claim 6, further comprising:

an oil temperature sensor for measuring temperature of oil in said clutch piston chambers; and wherein said control means stores the relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said oil temperature sensor; and determines the abrasion of the gear clutch corresponding to the selected clutch hydraulic control valve from this corrected time difference.

8. An apparatus in accordance with claim 7, further comprising:

an engine having an output shaft;

a revolution sensor for said output shaft for determining flow rate of pressurized oil to a respective clutch piston chamber; and wherein said control means stores relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said oil temperature sensor and a signal from said revolution sensor; and determines the abrasion of the gear clutch corresponding to the selected clutch hydraulic control valve from this corrected time difference.

9. An apparatus in accordance with claim 6, further comprising:

an engine having an output shaft;

a revolution sensor for said output shaft for determining flow rate of pressurized oil to a respective clutch piston chamber; and wherein said control means stores relations among a time when a respective clutch piston chamber is filled with pressurized oil so as to reach a predetermined pressure value, abrasion of respective clutches, and the temperature of oil in said clutch piston chambers; stores a time when a change over instruction is outputted to a selected clutch hydraulic control valve; finds a time difference between (a) a time when said change over instruction is outputted to said selected clutch hydraulic control valve and (b) a time when a pressure in the clutch piston chamber corresponding to the selected clutch hydraulic control valve reaches a predetermined value; corrects this time difference responsive to a signal from said revolution sensor; and determines the abrasion of the gear clutch corresponding to the selected clutch hydraulic control valve from this corrected time difference.

10. Apparatus comprising:

a hydraulic pump;

an acceleration pedal;

a speed sensor;

a plurality of clutch hydraulic control valves;

a transmission which includes a plurality of gear clutches, hydraulic operation pistons for receiving pressurized oil from said hydraulic pump through respective ones of said clutch hydraulic control valves to engage with corresponding ones of said plurality of gear clutches, and clutch piston chambers for receiving pressurized oil pressing these hydraulic operation pistons;

flow rate detection valves for detecting flows of pressurized oil from said hydraulic pump to said clutch piston chambers and for outputting a signal when the flows of pressurized oil are stopped;

control means for selecting a gear by a depression quantity of said acceleration pedal and a signal from said speed sensor and for outputting a change over instruction to a selected clutch hydraulic control valve; for storing a relation between a time T, when a respective clutch piston chamber is filled with pressurized oil so as to reach a predetermined pressure value, and a stroke L of the clutch corresponding to said respective clutch piston chamber; for storing a time when a change over instruction is outputted to a selected clutch hydraulic control valve; for finding a time difference between (a) a time when said change over instruction is outputted to said selected clutch hydraulic control valve and (b) a time when said signal from said flow rate detection valves indicates that the flows of pressurized oil are stopped; and for determining the abrasion of the gear clutch corresponding to the selected clutch hydraulic control valve from this time difference.

11. A method for detecting abrasion of a clutch of a transmission which includes a plurality of gear clutches, hydraulic operation pistons for receiving pressurized oil from a hydraulic pump through clutch hydraulic control valves to engage with these gear clutches, clutch piston chambers for receiving pressurized oil pressing these hydraulic operation pistons, and control means for selecting a gear by a depression quantity of an acceleration pedal and a signal from a vehicle speed sensor and for outputting a change over instruction to a selected clutch hydraulic control valve, said method comprising the steps of:

when shifting up or down from a present gear clutch to a next gear clutch, outputting an instruction for shifting gears to said present gear clutch and to said next gear clutch;

measuring a time from a start of this shifting of gears to a completion of filling of pressurized oil in the clutch piston chamber for said next gear clutch; and determining abrasion of said next gear clutch by a relation between a time T from a start of shifting gears to a completion of filling of pressurized oil in the clutch piston chambers, found in advance, and the stroke L of the gear clutches.

* * * * *